United States Patent [19]

Tibbals

[11] 4,310,088
[45] Jan. 12, 1982

[54] IN-LINE FEED SYSTEM

[76] Inventor: Charles E. Tibbals, P.O. Drawer A, Oneida, Tenn. 37841

[21] Appl. No.: 44,211

[22] Filed: May 30, 1979

[51] Int. Cl.³ .............................................. B65G 47/30
[52] U.S. Cl. .................................... 198/425; 198/492; 198/698
[58] Field of Search ............... 198/425, 456, 459, 461, 198/492, 688, 698, 699

[56] References Cited

U.S. PATENT DOCUMENTS

| | | | |
|---|---|---|---|
| 2,815,848 | 12/1957 | Jones | 198/425 X |
| 2,888,125 | 5/1959 | Engelson et al. | 198/461 |
| 3,575,278 | 4/1971 | Beaconsfield et al. | 198/425 X |
| 3,638,792 | 2/1972 | Bilocq | 198/425 X |
| 3,747,739 | 7/1973 | Fuchs et al. | 198/425 |
| 3,760,557 | 9/1973 | McIntyre | 198/425 X |
| 4,143,773 | 3/1979 | Everman et al. | 198/425 X |

Primary Examiner—James L. Rowland

[57] ABSTRACT

An improved machine for use in making parquet flooring blocks or tiles in a more efficient and rapid manner. The apparatus includes an in-line feeding system that controls movement, feeding, horizontal registration and spacing of individual slats as the slats are formed into groups of a predetermined size and as the groups are spaced apart for subsequent processing into parquet blocks or tiles.

9 Claims, 10 Drawing Figures

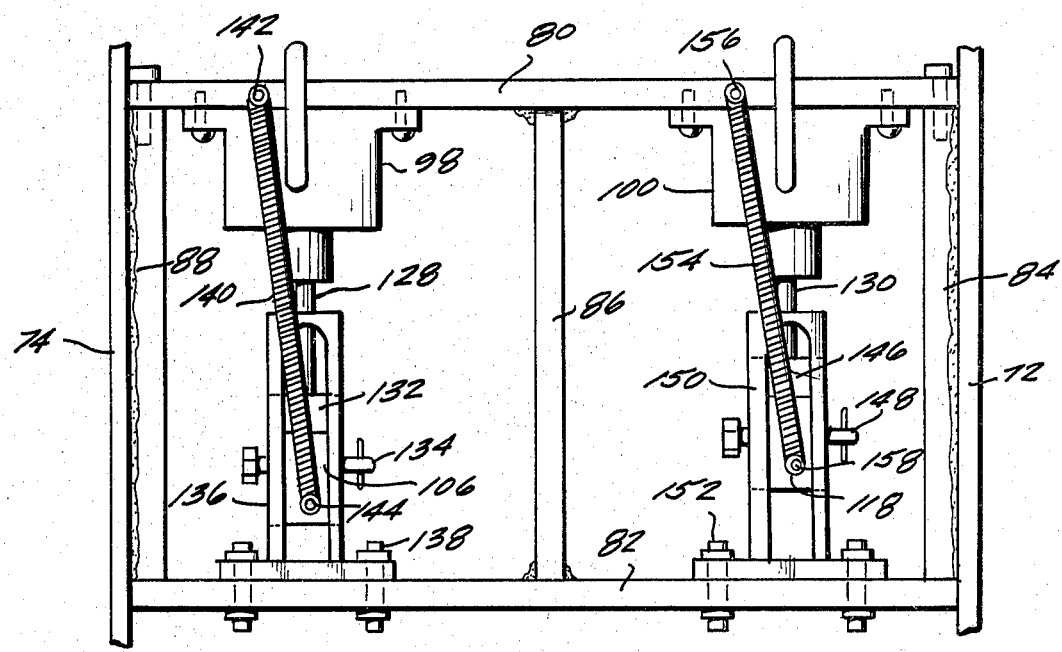
Fig. 4
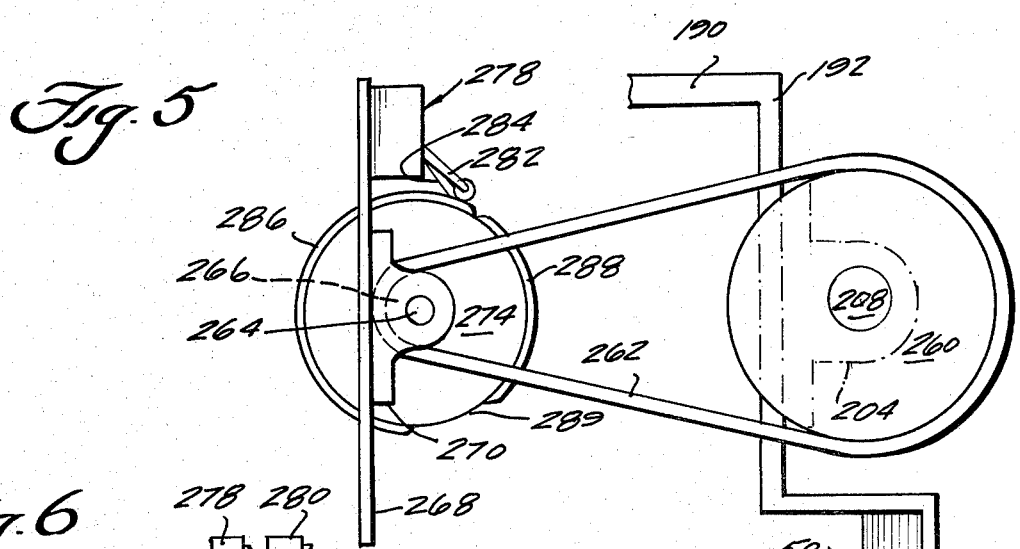
Fig. 5
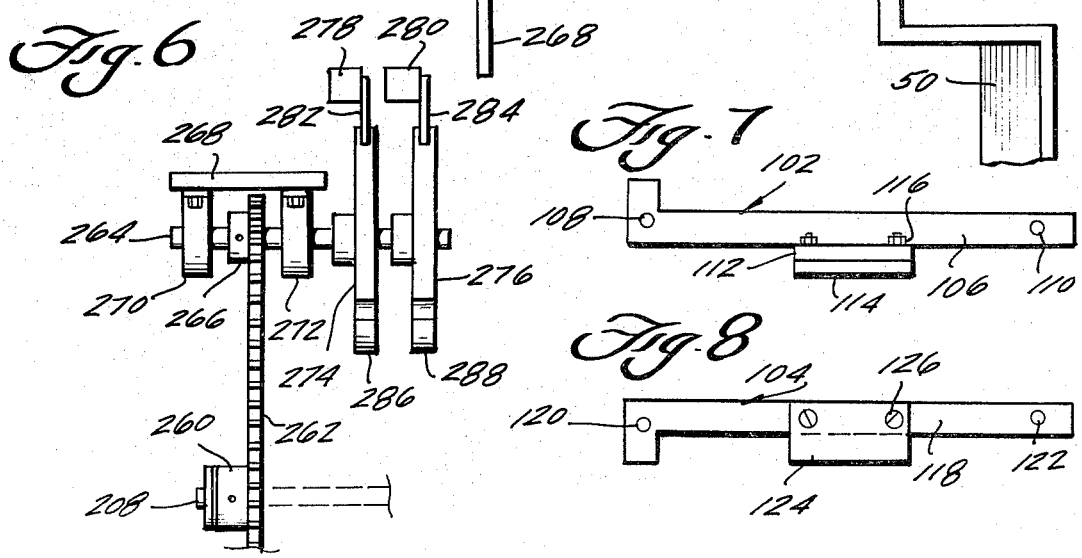
Fig. 6
Fig. 7
Fig. 8

IN-LINE FEED SYSTEM

BACKGROUND OF THE DISCLOSURE

For many years I have been involved in the parquet flooring block and tile industry and exemplary of previous patents that I have acquired in this field are U.S. Pat. Nos. 2,650,627, 2,961,021, 2,983,295, 3,118,804 and 3,128,511.

In one of my earlier patents, U.S. Pat. No. 2,983,361, I disclosed apparatus used in making parquet flooring blocks that disclosed what, at that time, was an improved method and apparatus for separating a long row of incoming slats into groups and subsequently conveying those groups on. In that device two parallel but transversely spaced apart conveying means were employed, one for moving slats into a metering area and a second for transferring metered groups of slats on toward further downstream processing areas. The metering of slats into those predetermined groups was accomplished by a transversely movable shuttle device that pushed or displaced a predetermined number of individual slats from one conveyor to the next. In that way, incoming slats could be effectively metered and formed into groups.

During the manufacture of parquet flooring blocks or tiles, it is common to employ a relatively long incoming line of individual slats in order to provide sufficient lead time to assure the slats are continuously available for processing notwithstanding the rate at which individual slats are cut to size. This relatively long line of individual slats must be separated into separate groups, each having a predetermined number of slats from which the blocks or tiles will be formed. These groups usually contain about seven individual slats but the number may vary to those needed for making blocks or tiles of any desired size. Likewise, it is important when forming these separate group of slats that the slats forming that group be kept in a proper horizontal registration not only so that they can be properly moved by downstream conveyors in a separate fashion but also because the finished blocks must be dimensioned properly to allow the blocks or tiles to be properly installed.

Slat forming machines as well as downstream processing equipment have become more efficient and accordingly, it has become more important to obtain better and more efficient means for forming the long line of individual slats into separated groups of a predetermined size while at the same time quickly establishing and maintaining the desired horizontal registration, in both the machine and cross machine direction so that both the speed and quality of feeding of those separate groups can be improved.

In the packaging field there are many examples of feed lines which employ overhead sweep type conveyors to aid in grouping items such as cans and boxes being packed. Exemplary devices are described in the following U.S. Pat., Nos. 2,805,755, 3,178,007, 3,194,382, and 3,424,293.

Most of these devices employ push rods connected to a chain mechanism with the push rod extending across the conveyor system thereby providing a pushing or restraining effect on the materials being moved.

There are also examples in the prior art of metering systems as are disclosed in U.S. Pat., Nos. 1,904,613, 2,815,848, and 3,747,739. In the first two fairly complicated mechanisms are disclosed to provide coordinated action between a presser foot type of stop member and a movable gate. The action of these two members is usually coordinated so that when the presser foot engages the articles being moved the gate releases articles previously held between the presser foot and the gate for further downstream travel. In each of these instances, however, the presser foot does not operate directly over a moving conveyor belt system but rather serves to push the article thereunder downwardly onto a stationary plate provided between upstream and downstream conveying systems. Control of such metering systems was found to be difficult in some instances and in U.S. Pat., No. 3,747,739 rather than completely stopping movement of the conveyed articles, the means for positioning and releasing articles is movable and articles are released to an accelerating device so that they are discharged at a speed greater than that of the incoming feed. Thus, the articles and the separation system itself are in motion.

SUMMARY OF THE PRESENT INVENTION

Unlike the prior known devices referred to above, the present invention achieves both metering and registration of slats during the process of sequentially forming a continuously feed line of slats into a plurality of groups in simple but efficient and fast manner. The primary in-feed conveying system extends not only beneath the metering area but also extends on beneath an overhead conveying system. There is also a direct connection between the first and a second downstream conveying system so that proper control and registration once obtained can be more easily maintained as the items are transferred from the upstream to downstream conveyors.

Metering and initial separation of the incoming line of slats into groups formed from a predetermined number of slats is accomplished by the coordinated action of a stop member works directly above the in-feed conveyor. The present invention does not require that the conveyor be broken in the metering area so that it continuously passes therethrough. Rather, the brake operates in a manner that allows the conveyor to slip beneath the stopped line of incoming slats so that the group between the gate and brake can depart on the conveyor while the remaining slats behind the brake are held in position. When the brake is released and the gate itself closed, the incoming line of slats will advance and engage the gate at which time the metering cycle can be repeated.

Each group of slats will advance toward the overhead conveyor which itself is provided with two conveyor chains on which two types of lugs are mounted. One type comprises pairs of registration lugs which are provided at predetermined intervals along the conveyor chain and serve to maintain alignment of the slats initially provided by the gate so they remain perpendicular to the feed or machine direction. The primary conveyor is moved at a feed rate which is faster than the feed rate at which the overhead conveyor operates so that the groups of slats are continuously urged into a tight engagement and pressed against the pair of registration lugs so that once the slats are properly oriented and registered in the machine direction that orientation will be maintained as the group of slats are conveyed toward the downstream conveying machine.

The secod type of lugs comprises pairs of hold down lugs positioned between the pairs of registration lugs. The bottom surfaces of the hold down lugs are at a height higher than the bottom of the registration lugs so that the former lie just above the upper surface of the slats. This assures that the slats will not buckle but will rather be held in a flat condition during their transport beneath the overhead conveyor. Further, horizontal registration means are provided to assure that correct horizontal or cross machine alignment is achieved while the slats pass beneath the overhead conveyor.

There is a pair of registration lugs also located directly behind each group of slats and at the point of transfer from the primary conveyor to the secondary downstream conveyor system each group will be effectively pushed onto the second conveyor by that following pair of registration lugs. Since each pair of registration lugs are perpendicular to the feed direction registry it will be maintained during this transfer stage.

DESCRIPTION OF THE DRAWINGS

These and other objects together with additional details of the present invention will be more fully understood when the following specification is read in conjunction with the following drawings which show:

FIG. 4 is a rear elevational of the control cylinders for operating the brake and gate assembly;

FIG. 5 is a diagrammatic elevational view of the control mechanism for controlling the operation of the brake and gate assembly;

FIG. 6 is a diagrammatic top plan view of FIG. 5;

FIG. 7 is a side elevation of the brake lever;

FIG. 8 is a side elevation of the gate lever;

DETAILED DESCRIPTION OF THE PREFERRED EMBODIMENT OF THE PRESENT INVENTION

Figure 1:
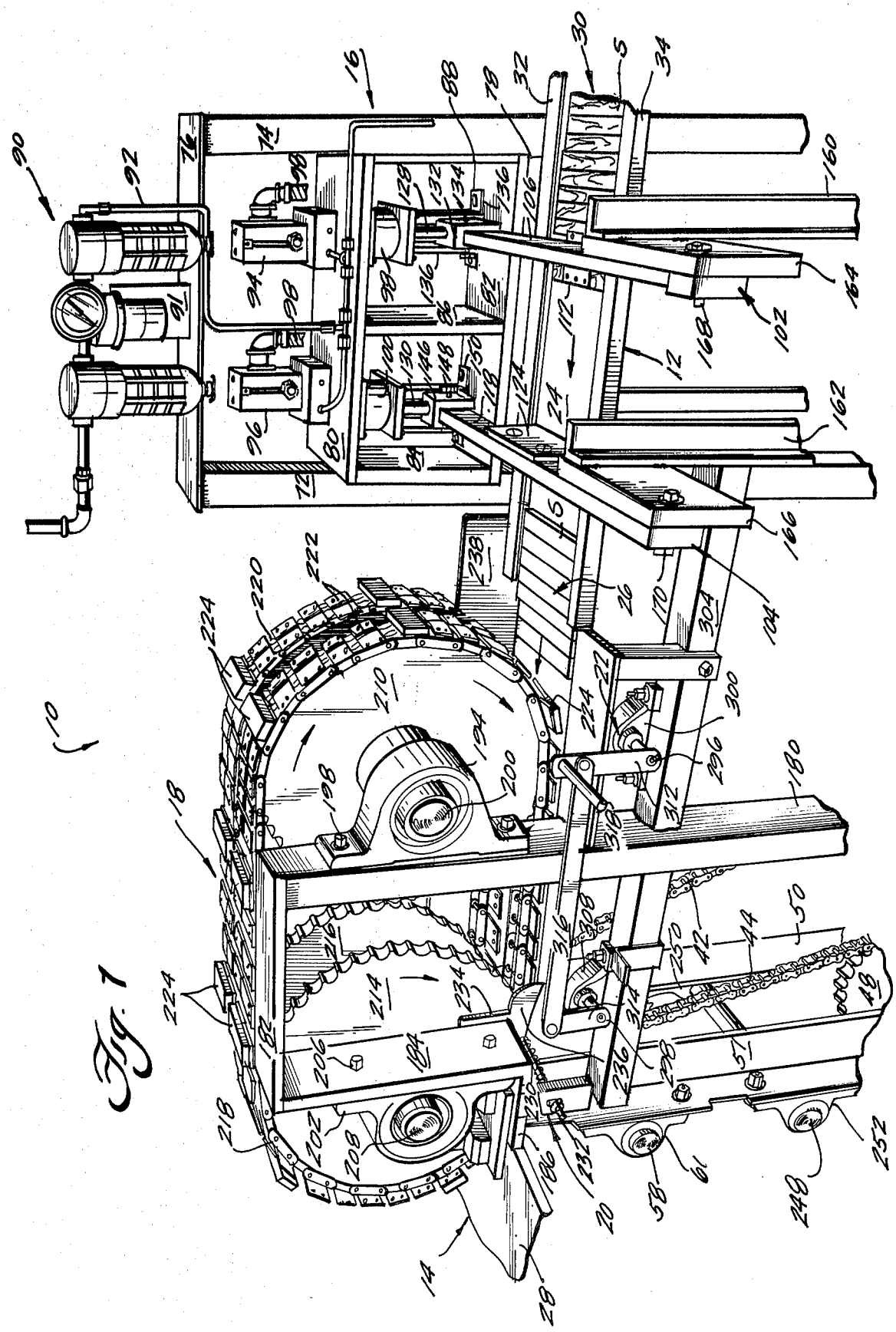
FIG. 1 is a perspective view showing the metering and feed systems used in the present invention.

Turning first to FIG. 1, the preferred embodiment of the present invention comprising an in-line feed system for use with parquet tile manufacturing equipment is generally indicated by numeral 10. It is generally comprised of various parts or sub-assemblies including a primary conveyor assembly, generally indicated at 12, a secondary conveyor assembly, generally indicated at 14, a metering assembly, generally located at 16, an overhead conveying assembly, generally indicated at 18, a horizontal registration assembly, generally indicated at 20, and a clearing assembly, generally indicated at 22.

The apparatus comprising the in-line or straight through feed system 10 is positioned downstream from a picking table (not shown) which includes a conventional vibrating slat feeder which correctly places individual slats S on the in-feed conveyor belt 24 in the form of a long column. After the slats S are formed into units or groups by the metering assembly 16, one of which is indicated generally at 26, they will be fed downstream by the combined action of conveyor belt 24 and the overhead conveying assembly 18 onto an inspection table, part of which is indicated at 28, and toward a conventional block assembly machine (not shown). What is important is to divide the long line or column 30 of incoming individual slats S, into units or groups of a predetermined size according to the size of parquet tiles being constructed in the block assembly machine.

Figure 3:
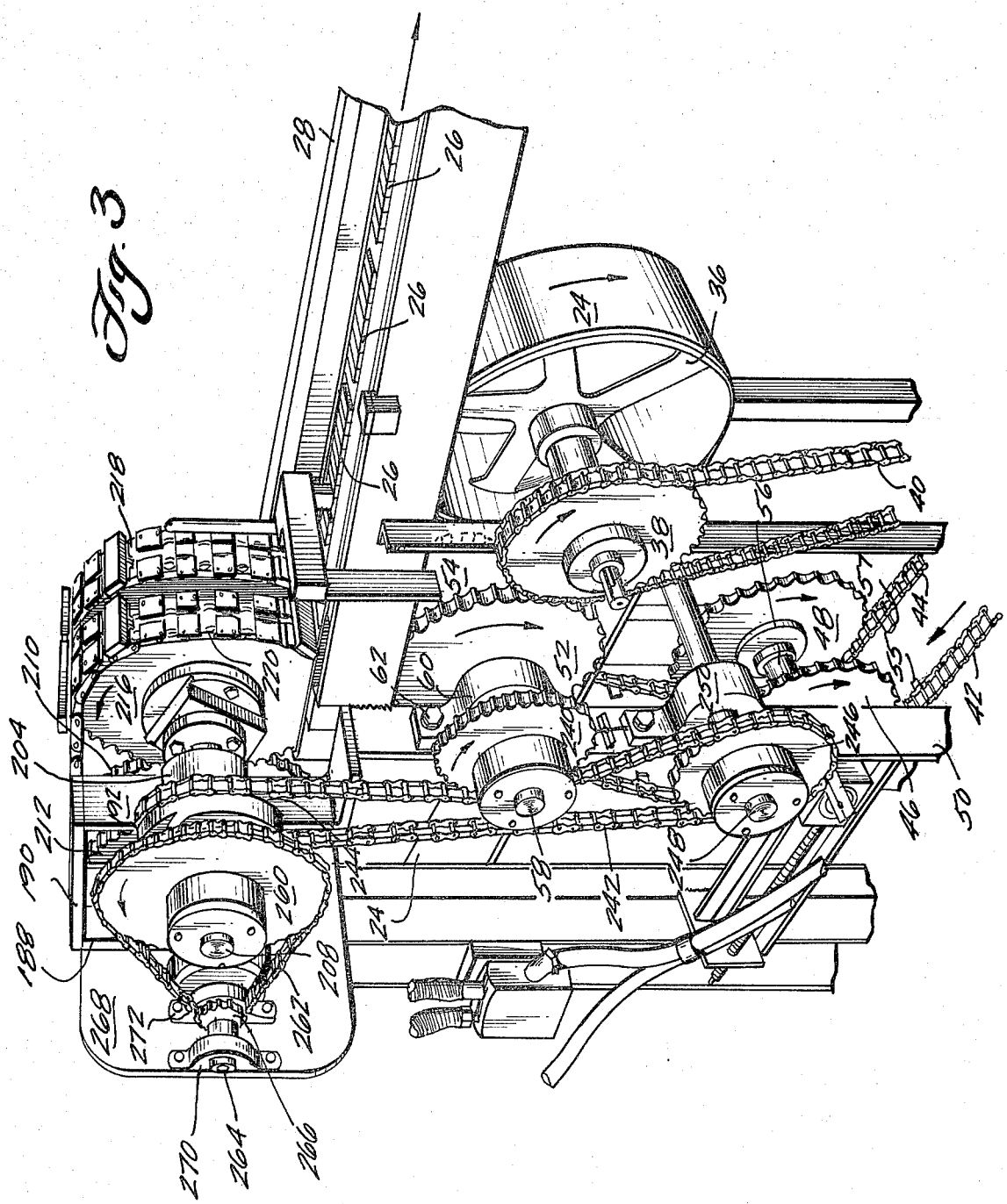
FIG. 3 is a perspective view of the drive means for driving the conveying systems used in the present invention.

The main in-feed conveyor belt 24 runs from the picking table through side guide or frame members 32 and 34 and continues on past the metering assembly 16, beneath the overhead conveying assembly 18 thereafter passes around hub 36 (a type 40B12), shown in FIG. 3, for its return to the picking table area for another closed circuit. In-feed conveyor belt 24 is driven by means of a sprocket 38 (a type 60Q45 gear), again shown in FIG. 3, and a drive chain 40 which is drivingly connected to any conventional and suitable type of drive means such as an electric motor and gear box structure (not shown). Depending upon the length of conveyor belt 24 it may be desirable to have additional drive means located at other spots along its length. Since such arrangements are known in the art and are of conventional design, further description thereof is not deemed to be essential in order to provide a complete description for one skilled in the art.

After slats have been properly metered into groups 26 and have been properly registered horizontally by means of the overhead conveying assembly 18 and the horizontal registration assembly 20 the slats are fed onto a second conveyor assembly. This is comprised primarily of bed chains 42 and 44, as shown in FIG. 3, which respectively pass over sprockets 46 and 48 (60Q45) rotatably mounted to the lower portion of the frame 50 beneath the overhead conveyor assembly 18. From sprockets 46 and 48 complementary downstream sprockets are of course provided for rotatably supporting chains 42 and 44 so that they can move groups 26 down the length of the inspection table 28 and discharge them into the block assembly machine. Bed chains 42 and 44 pass upwardly toward the overhead conveyor assembly 18 and around sprockets 52 and 54 (type 60A64 gears). Bed chains 42 and 44 then pass on into the inspection table 28 and as they do so specially designed links or lugs 55 and 57 within chains 42 and 44 respectively intersect groups 26. Lugs 55 and 57 serve to maintain the units in a separated condition and also assist in obtaining the proper registry of the slats horizontally. It should be noted that sprocket pairs 46 and 48 and 52 and 54 are respectively mounted on shafts 56 and 58. Shaft 58 is itself rotatably mounted to frame member 50 and 51 by means of pillow blocks 60 and 61 which themselves are secured to frame members 50 and 51 by bolts 62. Thus, the position of shaft 58 with respect to frame 51 is fixed. In order to provide means of adjusting tension in bed chains 42 and 44, shaft 56 is journaled in an adjusting device generally indicated at 64. Since each end of shaft 56 is supported in a similar manner only one will be described in detail. Specifically, shaft 56 is journaled in a slide block 66 slidably mounted within a frame 68 which is ridgidly secured to frame member 50 and 51. A threaded rod 70 threadily engages one end of frame 68 and is rotatably connected to slide block 66. Thus, as threaded rod 70 is rotated with respect to frame 68, slide block 66 slides therein under the control of rod 70. A like mounting arrangement is used for shaft 56 on the opposite side of the frame on frame 51 and accordingly, as both rods 70 are adjusted similar slide blocks 66 on each side of the frame will be moved and shaft 56 will be moved accordingly.

Turning our attention next to FIGS. 1, 4, 7, and 8, the metering assembly 16 can be seen as being comprised of a frame having vertical members 72 and 74, a top plate 76 and a bottom plate 78 as well as an inner frame having a top plate 80, a bottom plate 82 and three vertical wall members 84, 86, and 88. A conventional compressed air input and filter system is shown generally at 90 and is secured to top plate 76 by means of a mounting plate 91. An air line 92 leads from the air supply 90 and thereafter divides so as to provide input air to both solenoid operated valves 94 and 96.

Each has an electrical input line 98. The common air supply 90 with its condensers as well as solenoid valves 94 and 96 are of conventional construction and design so that further description thereof is not deemed to be essential to provide one skilled in the art with a complete description of the present invention. Solenoid valves 94 and 96 respectively control air cylinder 98 and 100 which in turn respectively control the operation of brake arm 102 and guillotine arm 104.

Figure 9:
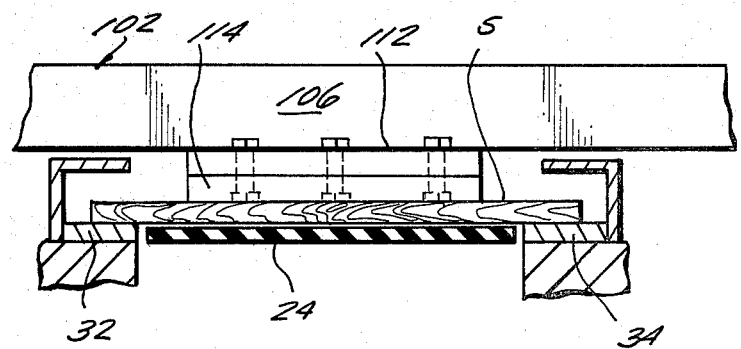
FIG. 9 is a cross sectional view of the main conveying assembly showing the brake lever of FIG. 7 in its lowered position.

Brake arm 102, as shown in FIGS. 7 and 9 is comprised of an L-shaped member 106 which is provided with two mounting holes 108 and 110 and a plate 112 which is welded or otherwise secured to the bottom side. A rubber pad 114 is held to plate 112, as for example, by screws 116 and when mounted in position, as shown in FIGS. 1 and 9, the rubber pad 114 will be positioned directly over conveyor 24.

Figure 10:
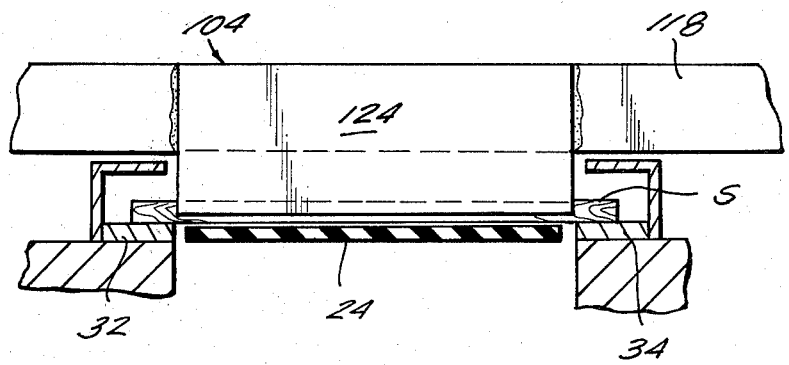
FIG. 10 is a cross sectional view of the main conveying assembly showing the gate lever of FIG. 8 in its lowered position.

Guillotine arm 104, as shown in FIGS. 8 and 10, is also comprised of an L-shaped arm 118 provided with mounting holes 120 and 122 and has guillotine plate 124 attached in the central portion of arm 118, as for example, by screws or bolts 126.

Air cylinder 98 includes an internal drive piston (not shown) which is connect to and controls cylinder drive rod 128. The other end of drive rod 128 is connected to a clevis 132 which is secured to the rear portion of brake arm 102 by pin 134 extending through mounting hole 110.

The rear portion of arm 106 is slidably retained within a bracket 136 secured to bottom plate 82 by bolts 138. Accordingly, the rear portion of arm 106 can slide within and is guided by bracket 136. Downward movement of arm 106 is affected by air cylinder 98 and drive rod 128 while its upward return stroke is provided by a return spring 140 connected between upper plate 80 and the rear of arm 106 by means of screws 142 and respectively 144. Thus, when the air supply to air cylinder 98 is shut off by solenoid 94, return spring 140 raises the rear portion of arm 106, thereby moving arm 106 vertically in an upward direction. This of course, raises the guillotine arm 104 to its raised or open position while when the air supply is connected to cylinder 98 the guillotine arm 104 will be in its lowered position as shown in FIG. 10.

Air cylinder 100 which controls the lowering of brake arm 102 has its own drive rod 130 connected to clevis 146 which in turn is connected to the rear portion of arm 118 by pin 148 which extends through rear mounting hole 122 as shown in FIG. 8. The rear portion of arm 118 is also slidably retained in bracket 150 secured to bottom plate 82 by bolts 152. In addition, a return spring 154 is again used to provide the return motion for arm 118 and return spring 154 as connected to the frame and specifically top plate 80 by means of screw 156 and to the rear of arm 118 by screw 158.

Frame members 160 and 162 serve to support mounting plates 164 and 166 which respectively pivotally support the opposite end of arms 106 and 118, such as by bolts 168 and 170, which respectively pass through mounting holes 108 and 120 of arms 106 and 118.

As will be pointed out in greater detail hereinafter, brake arm 102 and guillotine arm 104 are operated generally together but oppositely to one another so that when brake arm 102 is moved to its downward or braking position as shown in FIG. 9, guillotine arm 104 can be raised to allow one group of slats to pass on with the actuation of the guillotine arm of being slightly delayed.

Brake arm 102 is shown in its lowered or braking position in FIG. 9. When in this position rubber pad 114 contacts the upper surface of slats S. As indicated above, conveying belt 24 operates between side guide members 32 and 34 which as shown in FIG. 9 are comprised of essentially C-shaped members the open part of which face each other. The ends of slats S extend beyond the periphery of belt 24 and will, accordingly, be located within the channel formed by each of the C-shaped members 32 and 34 and just above the interior bottom surface of those channels. The surface of conveyor belt 24 is substantially at the same level as the bottom of the channels formed by guide members 32 and 34 so that when rubber pad 114 engages the upper surface of slats S, each end of those slats will be brought into contact with the interior bottom surface of guide members 32 and 34 over which they were positioned. Because belt 24 passes between guide members 32 and 34 downward pressure on slats S by brake arm 104 will not place pressure on the conveyor belt 24. To assure that belt 24 is not stopped, a section of the conveyor pan, (not shown) directly beneath the brake arm 102 is removed to permit the conveyor belt 24 to continuously move without restriction when brake arm 102 is in its lowered braking position, conveyor belt 24 passes beneath the line of slats.

Up until this time guillotine arm 104 has been in its lowered position as shown in FIG. 10. It is also in its lowered position when brake arm 102 is raised so that the line of slats will contact and be stopped by guillotine plate 124 when the slats reach that point after their release by brake arm 102. With the line of slats S again stopped, brake arm 102 will again be lowered. Thereafter, guillotine arm 104 can be raised. The upstream column of slats S is now retained by brake arm 102 and the group of slats 26 between the brake and guillotine arms can move on towards overhead conveyor 18. Thus, the operation of guillotine arm 104 is delayed slightly after brake arm 102 has been lowered. By delaying the operation of guillotine plate 124 in this manner the group of slats 26 which has now been metered will be initially horizontally squared when they come into contact with guillotine plate 124 and this horizontal registration is achieved with the help of conveyor belt 24 which continues to pass beneath the group of slats located between the brake and guillotine arms thereby urging them against plate 124. This horizontal squaring of the slats in each group 26 prior to their being released toward the overhead conveyor assembly 18 helps in initially establishing the proper horizontal orientation of the slats in each such group.

Following the movement of the measured group of slats 26 beyond guillotine arm 104 it can again be lowered so that guillotine plate 124 lies just above primary conveyor 24 as shown in FIG. 10 and simultaneously brake arm 102 will be raised thereby causing pad 114 to be lifted from the line of incoming slats S. Thus, the column of slats S will again be moved by conveyor 24 until the first slat in line comes into contact with guillotine plate 124 at which time the in-feed of slats will again be haulted. Continuing this cycle in such a timed relationship with the operation of the overhead conveyor assembly 18 will continuously provide a plurality of successively fed groups 26 of individual slats S to be fed in a regular but metered fashion.

Turning now to the overhead conveying assembly, generally indicated at 18, this assembly is supported by a frame positioned on each side. The frame on the front side, as shown in FIG. 1, is comprised of a vertical frame member 180, which can be an angle iron member, an upper support plate 182 and a second vertical member 184. Member 184 is welded or otherwise secured to a horizontal plate 186 which can be welded or otherwise secured to the top of frame member 51.

Figure 2:
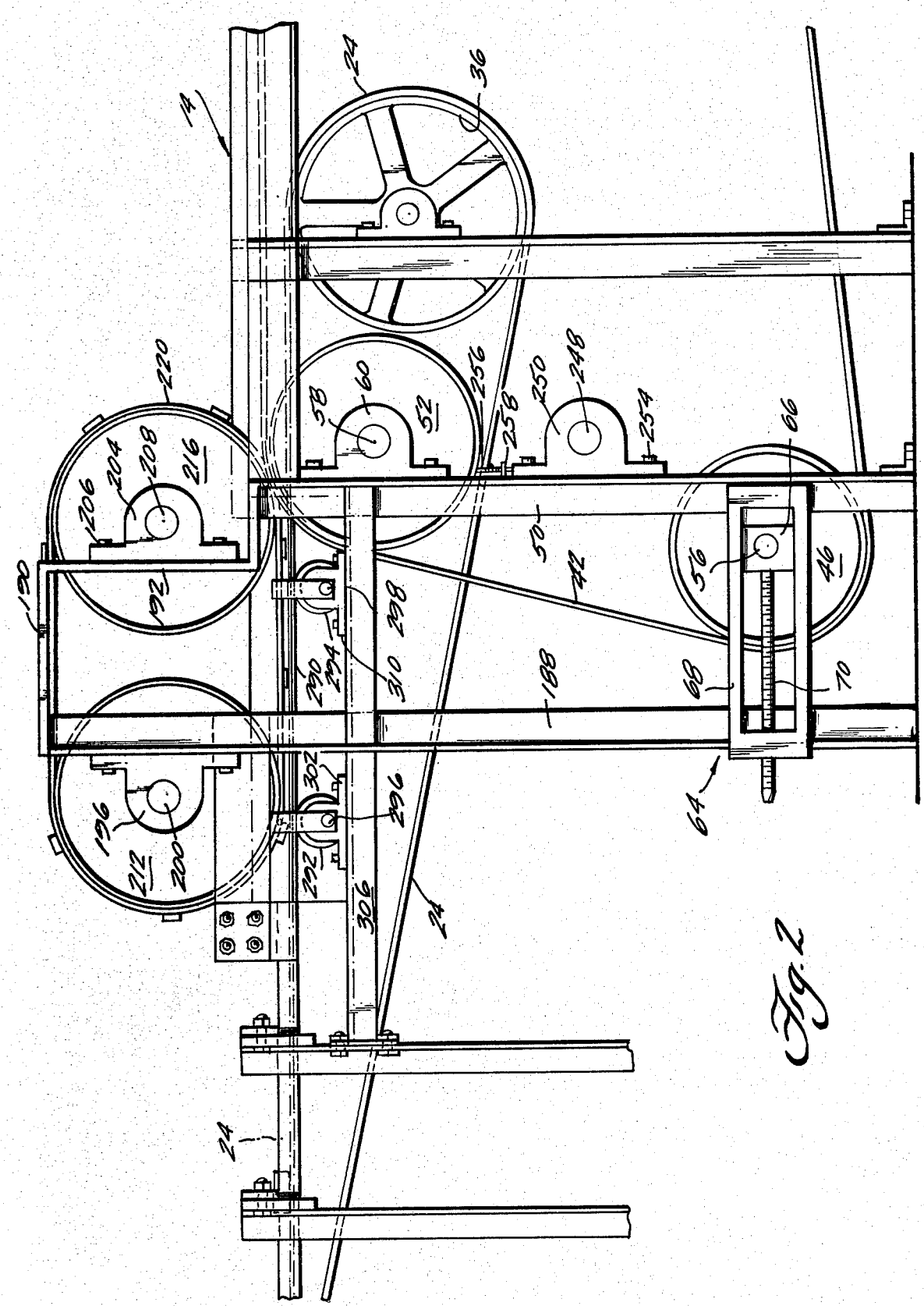
FIG. 2 is a diagrammatic side elevational view of the conveying systems employed in the present invention.

The rear frame for the overhead conveyor assembly is shown in FIGS. 2 and 3, and is comprised of a vertical frame member 188, which can also be an angle member similar to frame member 180, a top plate member 190 and a vertical member 192. Member 192 can be attached to the top of frame member 50 in a fashion similar to the way member 184 is secured to member 51. Frame members 180 and 188, respectively, have pillow blocks 194 and 196 attached thereto, as for example by bolts 198, and together rotatably support shaft 200. In a similar fashion, vertical plates 184 and 192 have pillow blocks 202 and 204 respectively secured thereto by bolts 206 and together serve to rotatably support shaft 208.

Sprockets 210 (a type 60Q50 gear) and 212 (a type 60Q50 gear) are securely connected to shafts 200 while sprockets 214 (a type 60Q50 gear) and 216 (a type 60Q50 gear) are likewise securely connected to shaft 208. Sprockets 210 and 214 serve to support chain 218 while sprockets 212 and 216 serve to support chain 220 with chains 218 and 220 providing the main drive mechanism of the overhead conveyor assembly 18.

Chains 218 and 220 are each provided with two kinds of lugs, specifically hold down lugs 222 and registration lugs 224 with all the lugs in one chain being substantially aligned with a complementary lug in the other chain. Hold down lugs 222 extend away from chains 218 so that when they are adjacent to conveyor 24 they will be positioned just above slats S with the groups 26 to thereby keep each slat in that group from buckling or otherwise moving in a vertical direction. It is not necessary that these hold down lugs engage the upper surface of the slats but they should close enough to prevent any great vertical movement.

As indicated previously conveyor belt 24 extends beneath the overhead conveyor assembly 18 and as shown in FIG. 1 one pair of registration lugs 224 and chains 218 and 220 are just about to come into position directly above conveyor belt 24 and one group 26 of slats is being moved toward them by conveyor belt 24. The pair of registration lugs 224 will arrive in their proper position above the conveyor in time to intersect the leading edge of the first slat in each group 26. Registration lugs 224 are also positioned on chains 218 and 220 so that they are aligned with each other and are together substantially perpendicular to the flow or machine direction established by conveyor belt 24. As conveyor belt 24 brings each group 26 into contact with a separate pair of registration lugs 224 the first and accordingly each successive slat will be kept in proper horizontal registration as initially established by guillotine plate 124 or will be brought into proper registration. Conveyor belt 24 is normally run at a rate of about 72 feet per minuite (fpm) while the overhead conveyor assembly 18 is normally operated at a rate of about 34 feet per minute (fpm). Thus, because conveyor belt 24 moves at a rate faster than the overhead conveyor assembly 18, after each group 26 comes into contact with a respective pair of registration lugs 224, conveyor belt 24 continues to move beneath that group 26 thereby continually urging each individual slat toward registration lugs 224. The pairs of registration lugs 224 are spaced so that they will bracket a group 26 there between. Accordingly, as each group 26 passes out from the other side of the overhead conveyor assembly 18 the pair of registration lugs following each unit will be available to push the group 26 on toward the downstream conveyor thereby continuing to maintain the registration of each of the slats in the group during the transfer step from conveyor belt 24 to the downstream conveyor, indicated previously as being comprised of chains 42 and 44.

Turning to FIG. 1, the horizontal registration assembly 20 is located on the front of the assembly and is mounted in between vertical member 184 and sprocket 214. A vertical plate 230 is connected to horizontal plate 186 by any convenient means such as welding and plate 230 serves to support one end of a threaded rod 232. The other end of rod 232 is connected to a vertical plate 234 which is provided with a curved guide indicated at 236. Plate 234 together with the guide 236 forms the horizontal registration means 20 and can be moved toward or away from vertical member 184 by means of rod 232. By such movement plate 234 can be adjusted so that individual slats S will be engaged, initially by the curved guide 236 and then the plate 234, and forced into alignment with the interior face of plate 234 as they are moved past by the combined action of registration lugs 224 and conveyor 24. Plate 234 establishes the final designed horizontal registration of each of the individual slats within each group 26. In order to provide a boundary on the opposite side of conveyor 24, a vertical plate 238 is provided along the length of the overhead conveyor assembly 18 against which the opposite side of slats S will pass.

The drive for overhead conveying assembly 18 is provided directly from the second or downstream conveyor comprised of bed chains 42 and 44 and this drive is provided directly from shaft 58 through drive sprocket 240 (a type 60Q30 gear) which is positioned on shaft 58 outwardly from pillow block 260 (a type 40P60 gear) which is secured to frame member 50. Drive sprocket 240 directly engages a drive chain 242 which in turn engages drive sprocket 244 (a type 60Q30 gear) secured to shaft 208 outwardly from pillow block 204 and frame member 192. Drive chain 242 also extends around a third drive sprocket 246 (a type 60Q30 gear) secured to shaft 248 which is rotatably connected to frame member 50 and 51 by means of pillow blocks 250 and 252. Pillow blocks 250 and 252 are each mounted in the same way and the following description with respect to pillow block 250 also applicable to pillow block 252. As shown in FIG. 2, pillow block 250 is mounted to frame member 50 by bolts 254. However, attached to one end of pillow block 250 is a threaded rod 256 which threadily engaged within a mounting plate 258 welded or otherwise secured to frame member 50. Thus, if bolts 254 are loosened, rotation of threaded rod 256 within plate 258 will cause pillow block 250 to be moved vertically, either upwardly or downwardly so that shadt 248 can be moved in a like manner thereby increasing or decreasing tension within drive chain 242. It is of course important for the operation of brake arm 102 and guillotine arm 104 to be coordinated with the operation of overhead conveying assembly 18 and the movement of the downstream conveyor, bed chains 42 and 44. Accordingly, the drive for the timing system is also taken directly from the drive means for that downstream conveyor. This is accomplished by employing a main timing drive sprocket 260 (a type 40P60 gear) which is also secured to shaft 208, as shown in FIG. 3, outwardly of drive sprocket 244. Sprocket 260 serves to drive a timing chain 262 which in turn is drivingly connected to shaft 264 through drive sprocket 266 (a type 40B12 gear) mounted thereon. Shaft 264 is rotatably mounted to a mounting plate 268 by means of pillow blocks 270 and 272 with mounting plate 268 itself being welded or otherwise rigidly secured to frame member 188.

Shaft 264 also serves to support two timing cams 274 and 276 which respectively operate micro switches 278 and 280 which in turn respectively control the actuation of solenoids 94 and 96. Micro switch 278 is provided with a following arm 282 while micro switch 280 is operated by following arm 284. Following arms 282 and 284 are respectively operated by caming surfaces 286 and 288 of timing cams 274 and 276.

As indicated previously, the creation of measured groups 26 of slats S is accomplished by the timed control of brake arm 102 and guillotine arm 104. Accordingly, it is necessary to control solenoids 94 and 96 in a predetermined, timed sequence to accomplish the proper operation of brake arm 102 and guillotine arm 104. It can be assumed that the operation cycle begins with a guillotine arm 104 having been placed in its lowered position and with brake arm having just been raised to its up position. Thus, solenoid 96 is deactuated and no air flow is applied to cylinder 100 while solenoid 94 is actuated and air is applied to cylinder 98. As shown in FIG. 5 the leading end of caming surface 286, which operates micro switch 278, that is normally on, has just engaged arm 282 to turn micro switch 278 off. Cam surface 288 has just terminated and arm 284 has been lowered turning micro switch 280 on thereby energizing solenoid 96 and connecting cylinder 100 to the air supply so that guillotine arm 104 is lowered. The break between cam surfaces 286 and 288, indicated at 289, corresponds to the period of delay between the lowering of brake arm 102 and the raising of guillotine arm 104. Thus, solenoid 94 will be actuated ahead of solenoid 96 and brake arm 102 will release the column of slats. The raising of guillotine arm 104 is delayed so that the column of slats will intercept plate 124 and be initially registered thereby. While there could be other arrangements, micro switch 280 is also normally on so that guillotine arm 104 is normally down while brake arm 102 is raised.

Thus, the present in-line feed system provides a very much improved slat feeding and metering system that operates at a much faster rate than any previous system. Additionally, this present feed system places the slats as well as the metered groups of slats into proper horizontal registration while the groups are being moved so that downstream production can proceed more efficiently and produce better tiles or blocks. Occasionally, it is necessary to stop operation of this in-line feed system and likewise to be able to remove one or more groups 26 from beneath the overhead conveyor assembly 18. This is accomplished in the present invention by providing a clearing assembly 22 beneath the overhead conveyor assembly 18. Clearing assembly 22 includes a support plate 290, as shown in FIGS. 1 and 2, directly beneath conveyor 24 and beneath the overhead conveying assembly 18. Plate 290 is supported by pairs of cams 292 and 294, respectively secured to shafts 296 and 298. Shaft 296 is rotatably mounted within pillow blocks 300 and 302 which are respectively mounted to horizontal frame members 304 and 306. Horizontal shaft 298 is rotatably mounted within pillow blocks 308 and 310 which are also secured to horizontal frame members 304 and 306. Shafts 298 and 296 are connected together by means of a linkage structure comprised of vertical links 312 and 314 and a cross link 316. A handle 318 is secured to link 312 and accordingly the raising and lowering of plate 290 is accomplished by moving handle 318 either clockwise or counterclockwise. Since shaft 298 is connected to shaft 296 through this linkage arrangement movement of link 312 and accordingly of shaft 296 will cause a like movement of shaft 298 thereby causing both cams 292 and 294 to be moved in the same direction thereby lowering plate 290.

As shown in FIG. 2 plate 290 is in its raised operating condition. Because cams 292 and 294 are positioned on shafts 296 and 298 in an off center condition, the cams will operate eccentrically so that when handle 318 is moved plate 290 will be lowered a substantial distance allowing the easy removal of any slats from beneath overhead conveyor assembly 18 in a very simple manner so that any obstructions can be cleared from conveyor belt 24 and from beneath the overhead conveying assembly 18.

While the invention has been described in connection with what is presently conceived to be the most practical and preferred embodiment, it is to be understood that the invention is not to be limited to the disclosed embodiment but on the contrary, is intended to cover various modifications and equivalent arrangements included within the spirit and scope of the appended claims, which scope is to accord the broadest interpretation of such claims so as to encompass all such equivalent structures and methods.

What I claim is:

1. An improved in-line feed system for feeding a plurality of individual wood parquet tile slats, each having a long and short dimension, along a predetermined in-line path and for dividing those incoming slats into predetermined sized groups while registering and orienting the slats in each group, said system including first conveyor means for continuously moving slats along said in-line path, metering means for dividing said slats into groups comprised of a predetermined number of slats, said metering means positioned above said first conveyor means, second conveyor means positioned above a portion of said first conveyor means for cooperating therewith to receive the metered groups and for orienting the slats in each group so that the long dimension of each slat is positioned normally to said in-line path and for preventing the slats in each from buckling as they pass thereunder, third conveyor means positioned in-line with and downstream from said first and second conveyor means, said second conveyor means terminating upstream from the termination point of said first conveyor thereby defining a discharge point where the group of metered and oriented slats emerge from their passage between said first and second conveyor means, said third conveyor means including slat receiving means at least part of which is positioned outboard of said discharge point and said first conveyor means for intersecting and transferring the groups of slats from said first conveyor means to said third conveyor means in their oriented condition as the groups are discharged from between said first and second conveyor means and drive means for driving said system wherein said second and third conveyor means operate at a first rate while said first conveyor means operates at a second faster rate.

2. An in-line feed device for moving slats from slat cutting machinery to parquet tile equipment, said device being comprised of first conveyor means for feeding individual slats from the slat cutting area downstream a predetermined distance along a predetermined path toward a transfer point, second conveyor means, positioned outboard of said first conveyor means adjacent said transfer point, for receiving slats from said first conveyor means, metering means positioned upstream from said transfer point for dividing slats moving along said first conveyor means into groups, each group having a predetermined number of slats, overhead conveyor means positioned between said metering means and said transfer point and above said first and second conveyor means and said transfer point for receiving metered groups of slats and for cooperating with said first conveyor means to establish and maintain the orientation of individual slats within said groups normal to said predetermined path so that the groups are transferred to said second conveyor means in their metered and oriented condition.

3. A device as in claim 2 wherein said metering means included brake means and gate means for alternately stopping movement of incoming slats as divided spaced apart position along said first conveyor means without stopping movement of said first conveyor means therepast, said brake means for positioning upstream from said gate means.

4. A device as in claim 2 wherein each slat has front, rear and side edges, said device further including first registration means for aligning the side edges of individual slats in each group to form the side edges of the group and said overhead conveyor means includes second registration means depending therefrom for aligning the front and rear edges of the slats in each group to be normal to said predetermined path.

5. An in-line feed device for metering and registering a plurality of slats into groups for forming parquet flooring tiles, said device comprising first conveyor means for receiving individual slats from a forming maching and for conveying said individual slats forward along a path, said first conveyor means operating at a first rate of travel, metering means for collecting said individual slats at a first position along said path and for successively releasing groups each having a predetermined number of slats; an overhead sweep conveyor positioned downstream of said first position and over a portion of said path of said first conveyor, said overhead sweep conveyor having a plurality of spaced apart registration lug means for extending between said separated groups of slats, said overhead sweep conveyor operating at a second, slower rate of travel so that each of said group of slats is forced against one of said plurality of registration lug means by the cooperation of said first conveyor means and the overhead sweep conveyor as each of said groups of slats is moved beneath said overhead conveyor, said overhead conveyor including secured lug means for preventing respective slats in said group from buckling as they pass beneath said overhead sweep conveyor; second conveyor means for receiving groups of slats upon discharge from said overhead conveyor and for conveying the spaced apart groups in a direction in-line with said path, said second conveyor means having means for maintaining the spaced-apart relationship between said groups of slats; actuating means for timing the action of said metering means in a timed manner with the operation of said overhead sweep conveyor, drive means for driving said first and second conveyor means, said overhead conveyor and said actuating means, so that individual slats received by said first conveyor means are transferred to said second conveyor means in a metered and registered orientation while continuously travelling along a path that is continuously in line with their original movement.

6. An in-line feed device for successively placing groups of slats having lengths upon a conveyor which advances said groups to a parquet tile forming machine said device comprising: first conveyor means for receiving individual slats and for conveying said individual slats forward along a path, said first conveyor means operating at a first rate of travel, metering means for collecting said individual slats at a first position along said path and for successively releasing groups each having a predetermined number of slats, said slats of said released groups of slats having their lengths oriented in a direction across the direction defined by said path, downstream of said first position and over a portion of said path of said first conveyor, said overhead conveyor having a plurality of spaced apart registration lug means for extending between said separated groups of said slats, said registration lug means having a width less than the length of said slats, said overhead conveyor operating at a second, slower rate of travel so that each of said group of slats is forced against one of said plurality of registration lug means by the cooperation of said first conveyor means and said overhead conveyor as each of said groups of slats is moved beneath said overhead conveyor, said overhead conveyor including second lug means for preventing respective slats in each of said groups from buckling as they pass beneath said overhead conveyor, and second conveyor means positioned adjacent the output end of said overhead conveyor with at least a portion thereof being located outboard of said first conveyor means for receiving the metered groups of slats emerging from between said overhead conveyor and said first conveyor means and for removing the metered groups from said first conveyor means for feeding said groups downstream, said second conveyor means being driven at said second rate of travel and drive means for driving said in-line feeding device.

7. An in-line feed device for successively placing groups of slats upon a feed conveyor of a parquet tile forming machine, comprising a feed conveyor including at least one pair of spaced apart belts for accepting said groups of slats therebetween, said belts having a plurality of consecutively spaced apart belt lugs which each extend a distance inwardly for extending between said groups of slats, said feed conveyor including drive means for causing said groups of slats to travel in a first line of direction at a feed-rate of speed; said in-line feed device comprising:

first conveyor means for receiving individual slats at a receiving end thereof and for conveying said individual slats forward along a path in-line with said first line of direction, said first conveyor means having a discharge end extending between said spaced apart belts, said first conveyor means operating at a rate of travel greater than said feed-rate of travel, metering means for collecting said individual slats at a first position along said path and for successively releasing groups each having a predetermined number of slats, an overhead conveyor oriented in-line with said path and positioned downstream of said first position and over at least a portion of said discharge end, said overhead conveyor operating at said feed-rate of speed, said overhead conveyor including registration lug means for extending between said released groups of slats, means for horizontally registering said slats within said groups and second lug means for preventing respective slats in each of said groups from buckling as they pass beneath said overhead conveyor, means for driving said overhead conveyor synchronously with said feed conveyor so that said registration lug means and said belt lugs are continuously brought to meshing proximity of each other beneath said overhead conveyor, so that said groups of slats are set in metered and registered orientation by the cooperation of said over-head conveyor and said first conveyor and are intercepted by and transferred to said feed conveyor while said groups of slats continuously travel in an in-line direction.

8. An in-line device as claimed in claim 1, 2, 5, 6 or 7 wherein said first conveyor means includes support means for supporting said first conveyor means beneath said overhead conveyor, said support means being vertically moveable between at least a raised operating position and a lowered non-operating position.

9. An in-line feed device for moving slats from slat cutting machinery to parquet tile equipment, said device being comprised of first conveyor means for feeding individual slats from the slat cutting area downstream a predetermined distance along a predetermined path toward a transfer point, second conveyor means, positioned outboard of said first conveyor means adjacent said transfer point, for receiving slats from said first conveyor means, metering means positioned upstream from said transfer point for dividing slats moving along said first conveyor means into groups, each group having a predetermined number of slats, overhead conveyor means positioned between said metering means and said transfer point and above said first and second conveyor means and said transfer point for receiving metered groups of slats and for cooperating with said first conveyor means to establish and maintain the orientation of individual slats within said groups normal to said predetermined path so that the groups are transferred to said second conveyor means in their metered and oriented condition, wherein said overhead conveyor means includes a frame, first and second axles rotatably mounted in said frame so as to be normal to and spaced apart in the machine direction, two pairs of sprockets, one pair being mounted on each axle so that the sprockets on first axle are in-line with those on the second axle, first and second drive chains each running from one sprocket on the first axle to the sprocket in-line with it on the second axle, each drive chain having a plurality of first lugs spaced apart and aligned to be normal to said predetermined path, each chain having a plurality of second lugs positioned between said first lugs, and recessed inwardly from said first lugs, said first lugs serving to position the slats in each group, said second legs serving to prevent slats from buckling during feeding.

* * * * *